United States Patent
Sebastian et al.

(10) Patent No.: US 6,834,540 B2
(45) Date of Patent: Dec. 28, 2004

(54) ENGINE CYLINDER EVENT FILL-IN (PHYLINDER)

(75) Inventors: Scott Sebastian, Three Rivers, MI (US); William Wittliff, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 19 days.

(21) Appl. No.: 10/324,011

(22) Filed: Dec. 20, 2002

(65) Prior Publication Data

US 2004/0055368 A1 Mar. 25, 2004

Related U.S. Application Data

(60) Provisional application No. 60/411,867, filed on Sep. 20, 2002.

(51) Int. Cl.[7] .............................................. G01M 19/00
(52) U.S. Cl. ..................................................... 73/118.1
(58) Field of Search ................................ 73/118.1, 116; 701/101, 102, 111; 123/643, 406.58, 406.19, 406.65, 406.27, 406.23, 406.44; 324/175, 392, 391; 315/367

(56) References Cited

U.S. PATENT DOCUMENTS

| | | | | |
|---|---|---|---|---|
| 4,472,779 A | * | 9/1984 | Marino et al. | 701/99 |
| 5,140,961 A | * | 8/1992 | Sawamoto et al. | 123/406.27 |
| 5,144,560 A | * | 9/1992 | Kurihara et al. | 701/102 |
| 5,186,144 A | * | 2/1993 | Fukui | 123/406.58 |

* cited by examiner

*Primary Examiner*—Edward Lefkowitz
*Assistant Examiner*—Octavia Davis
(74) *Attorney, Agent, or Firm*—Baker & Hostetler LLP

(57) ABSTRACT

A fill-in apparatus for an engine that injects a pseudo cylinder signal when an ignition event is missing from a cylinder. The pseudo cylinder signal is injected if no ignition event occurs at an end of a time period designated for that cylinder. An algorithm can be used to determine an engine period, determine a cylinder time, determine a predictive window, and analyze the cylinder ignition event to see if the fill-in signal is needed.

18 Claims, 8 Drawing Sheets

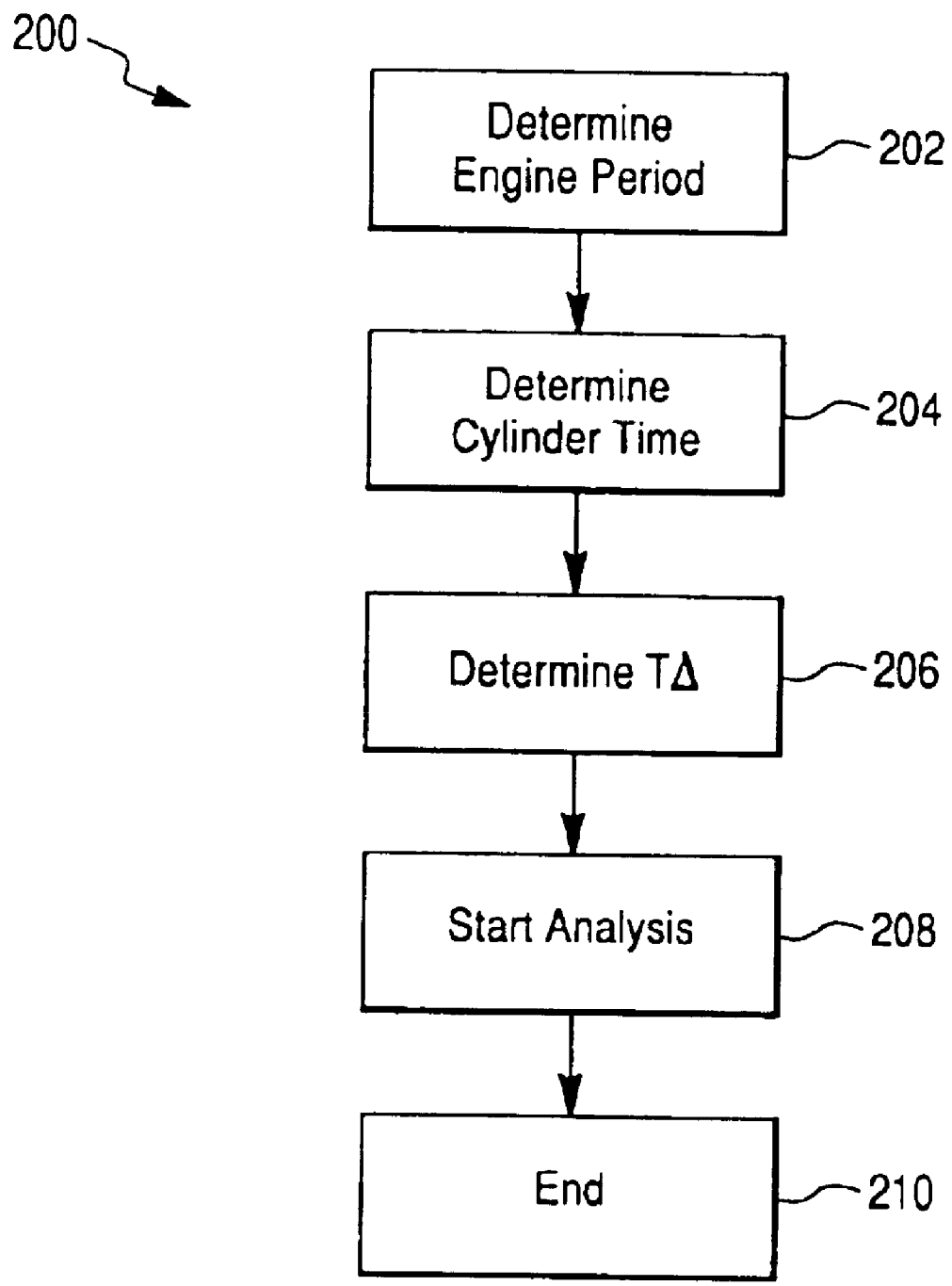

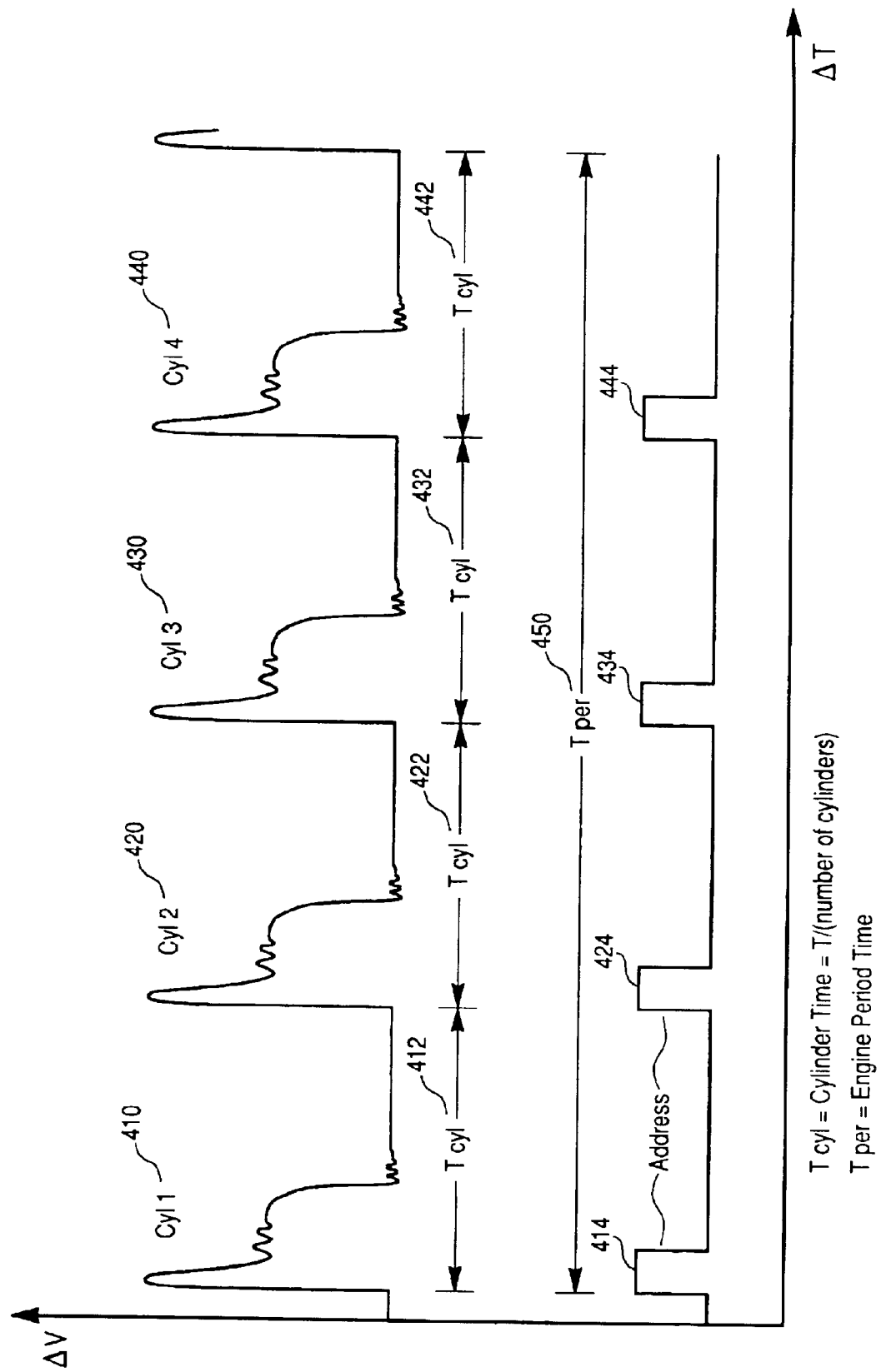

ENGINE CYLINDER EVENT FILL-IN (PHYLINDER)

PRIORITY

This application claims priority to the provisional U.S. patent application entitled, Engine Cylinder Event Fill-In (Phylinder), filed Sep. 20, 2002, bearing application Ser. No. 60/411,867, the disclosure of which is hereby incorporated by reference.

FIELD OF THE INVENTION

Embodiments of the present invention generally relate to an apparatus and method for analysis of engines. More particularly, the present invention relates to an apparatus and method to fill-in an ignition event when one (or more) ignition event is missing.

BACKGROUND OF THE INVENTION

Conventional combustion, reciprocating engines are widely used as automotive engines. A conventional engine (single-cycle, two-cycle and others) is typically composed of an engine or cylinder assembly having one or more cylinders therein. A piston is slidably disposed in the cylinder and moves reciprocally within the cylinder. A cylinder head at one end of the cylinder completes the cylinder assembly. The cylinder head typically contains the valves (intake and exhaust) and the spark plug. The spark plug typically ignites a pre-mixed fuel that is injected by the intake valve into a combustion chamber and helps to define an ignition event.

Should an ignition event not occur or the cylinder misfires, it can reduce the power output of the engine, can cause low fuel economy, increased emissions and poor performance. Engine analyzers are used to analyze the performance of internal combustion engines. Engine tests can include detection of rotation-per-minute fluctuations of engine input, exhaust pipe temperature changes, relative temperature differences among the exhaust ports, rotational torque variations, exhaust pressure pulsing, and abnormal content of exhaust gases.

A conventional digital analyzer can convert analog signals to digital signals for display on an oscilloscope, which displays snapshots of discrete portions of the signals as waveforms. In the case of multiple cylinders, waveforms showing the primary and the secondary ignition voltages are displayed. The voltages are acquired from a primary and a secondary lead that are connected to an ignition coil. A synch probe may be attached to the first cylinder so that the analyzer can identify the cylinders (by knowing where in the sequence the first cylinder is) and determine the firing order of the cylinders. The analyzer can display sweeps, such as an engine sweep or a fixed time sweep. Engine sweeps can display a single cylinder ignition event or a complete cycle of ignition events. Additionally, the engine sweep may be displayed as cylinder, parade, or raster. Cylinder sweep displays only a single cylinder waveform while the parade and raster display all the cylinders but in a horizontal progression or stacked vertically on top of one another, respectively. The fixed time sweep displays a fixed period of time in which the data is to be collected and shown as determined by a user.

Regardless of which sweep the analyzer displays, the analyzer can show false readings when a cylinder misfires. For example, the engine may have four cylinders and are designed to fire in order of 1, 2, 3, and 4. If the second cylinder misfires (or not fire at all), then the data gathered by the analyzer may be skewed. The analyzer will pick up the signal from the first cylinder's ignition event, but because the second cylinder does not fire, the data from the first cylinder can be extended until the third cylinder's ignition event. When the third cylinder's ignition event is collected, the analyzer may think that the second cylinder has fired so the data for the third cylinder will be off and the same for the fourth cylinder (analyzer thinks the third cylinder's ignition event, when it is really the fourth cylinder's ignition event). If the analyzer displays bad data, then it can take longer to locate and fix the correct cylinder, leading to unnecessary costs to the consumer.

Therefore, there is a need for an apparatus and a method to compensate or fill-in for the misfired ignition event so that the analyzer can display accurate data.

SUMMARY OF THE INVENTION

Embodiments of the present invention generally provide for an apparatus and method to allow the analyzer to collect the correct data and store it for correct display on the oscilloscope even if an ignition event does not occur.

In one embodiment, a method to fill-in an ignition event in an engine is provided and can include determining an engine period of the engine, determining a cylinder time from the engine period, determining a predictive window time, and analyzing the cylinder ignition for a time period to determine if a fill-in signal should be injected. The engine period can be the period of an engine cycle of the engine. The cylinder time can be calculated by dividing the engine period by the number of cylinders. The predictive window time may be related to the r.p.m of the engine. Analyzing the cylinder ignition event can further include starting the time period, determining if the ignition event occurred at the end of the time period, and injecting the fill-in signal if no ignition event occurs by the end of the time period. The time period can be the predictive window time plus the cylinder time or can be the cylinder time, when the preceding event included injecting the fill-in signal.

A fill-in apparatus for an engine is also provided and can include an engine period determiner that can calculate an engine period, a cylinder time determiner that can calculate a cylinder time, a delayed time determiner that can calculate a predictive window time; and a pseudo cylinder injector to inject a pseudo cylinder signal, wherein the injector and the determiners are in communication with each other. The pseudo cylinder injector can inject the pseudo cylinder signal based on a time period. The fill-in apparatus can start the time period, and injects the pseudo cylinder signal if there is no ignition event at that cylinder by the end of the time period. The cylinder time determiner can calculate the cylinder time by dividing the engine period by the number of cylinders of the engine. The delayed time determiner may calculate the predictive window time based on the r.p.m of the engine. The time period can be the cylinder time when the previous event included injecting a pseudo cylinder signal. The time period can be the predictive window time plus the cylinder time.

A fill-in system for an engine that can include a means for determining an engine period of the engine, a means for determining a cylinder time from the engine period, a means for determining a predictive window time, and a means for analyzing the cylinder ignition for a time period to determine if a fill-in signal should be injected. The means for determining the engine period can calculate the engine period based on the engine cycle. The means for determining the cylinder time can calculate the cylinder time by diving the engine period by the number of cylinders. The means for determining the predictive window time can calculate the predictive window time based on the r.p.m of the engine. The means for analyzing the cylinder ignition can inject the fill-in signal if the ignition event does not occur by the end of the time period. The time period can be a cylinder time or a delayed time plus the cylinder time.

In a further embodiment of the invention, a signal generator can include a controller that calculates an engine period, a cylinder time, a predictive window time for an engine, and a signal injector that can inject a pseudo cylinder signal if an ignition event does not occur at a cylinder of the engine, wherein the controller communicates with the signal injector.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an algorithm of an embodiment of the present invention.

FIG. 4 is a graphical representation of an engine cycle.

DETAILED DESCRIPTION OF THE PREFERRED EMBODIMENT

The embodiments of the present invention provide an apparatus and method to create a pseudo cylinder signal or fill-in an ignition event if the ignition event is missing from the engine cycle. The present invention can work with engines with varying number of cylinders (1, 2, 4, etc.) and conventional analyzers. The analyzer can be analog or digital. The analyzer can also be r.p.m. (rotation-per-minute) related that can detect signals. The term cylinder event and ignition event are both used interchangeably herein. The "sync event," "cylinder event," "cylinder timer event," and "delayed timer event" routines discussed below are not meant to be in any particular order and can run concurrent with each other.

Figure 1:
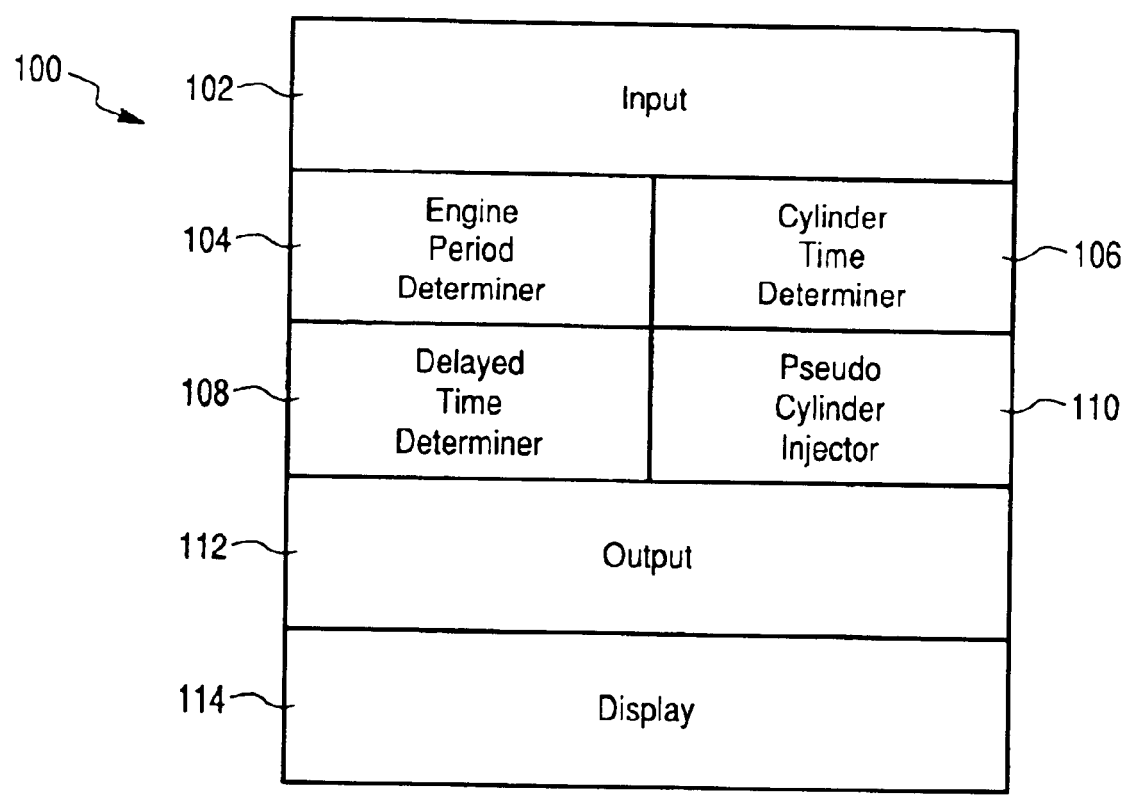
FIG. 1 illustrates a block diagram of an analyzer.

FIG. 1 illustrates a block diagram of an analyzer 100. The analyzer may be analog or digital, but preferably digital. The analyzer 100 can include an input 102, engine period determiner 104, cylinder time determiner 106, delayed timer determiner 108 (or a predictive window determiner), pseudo cylinder injector 110, output 112, and display 114. The input 102 may include multiple primary and secondary leads that gather voltage information on the ignition event of each cylinder. The input 102 may also have a user interface so that the user can interact with the analyzer 100. Although not required, the analyzer 100 can have at least one memory slot to store the collected data, but preferably has multiple memory slots to store data from each cylinder's ignition event. Additionally, the input 102 may include a synch probe attached to a first cylinder of the engine to indicate that one engine cycle is completed when the analyzer 100 receives a second signal (after the initial signal) from the synch probe. Although the synch probe is typically attached to the first cylinder, the synch probe can be attached to any cylinder of the engine to indicate when an engine cycle is completed.

The synch probe can also be used by the engine period determiner 104 to determine the engine period of the engine. The user may input or select the type of engine to be analyzed and the engine period determiner 104 with the synch probe can determine the engine period. The engine period can represent a complete engine cycle. The cylinder time determiner 106 can divide the engine period by the number of cylinder(s) of the engine being selected by the user to determine the cylinder time. The cylinder time can be the time between each ignition event of each cylinder.

The delayed timer determiner 108 can determine the TΔ or the predictive time, which is a variable delayed offset that is related to the r.p.m. of the engine being tested and is an amount of time before a true ignition event occurs. The higher the r.p.m., the lower the TΔ and vice versa (the lower the r.p.m., the higher the TΔ). The pseudo cylinder injector 110 is designed to inject a pseudo cylinder signal when an ignition event does not occur at a predetermined time for that cylinder. The pseudo cylinder signal indicates to the analyzer to stop recording the ignition event, store the data in a memory slot (if there is one), and prepare to collect data for the next ignition event.

The output 112 can relay the information gathered and processed by the analyzer 100 to a display 114. The display 114 can be visual and/or audible. The display 114 can be integrated with the analyzer 100 such as an oscilloscope, or can be remotely located on a computer or similar devices, both of which can display various information including time and change in voltage.

FIG. 2 is an algorithm 200 of an embodiment of the present invention. The algorithm 200 may be programmed into the analyzer 100. The analyzer 100 may also have a field programmable gate array (not shown) to execute the algorithm 200. At step 202, the engine period is determined for the particular engine being tested by using the analyzer 100 with the synch probe and completing at least one engine cycle. At step 204, the cylinder time is determined by dividing the engine period (determined in step 202) by the number of cylinder(s) of the engine being tested. At step 206, the TΔ can be determined for the rotation-per-minute (r.p.m.) that the engine will be tested at. The TΔ can serve as a cushion or a predictive time in case the ignition event occurs later then expected (during the cylinder time) so that the pseudo cylinder signal is not falsely generated. At step 208, the analyzer 100 can start the analysis by inserting the TΔ and the cylinder time for the cylinder. An ignition event should occur before the end of the TΔ and the cylinder time. If there is no ignition event, then the pseudo cylinder signal is generated by the pseudo cylinder injector 110. Additionally, for the next ignition event after the pseudo cylinder signal injection, the algorithm 200 will insert just the cylinder time as the time that it should expect the next ignition event (See FIG. 5). If there is an ignition event, the analyzer 100 will then insert the TΔ and the cylinder time as the time that it should expect the next ignition event. The process can continue until the end of the engine period or when the analyzer 100 receives a signal from the synch probe indicating that one engine cycle has completed. The analyzer 100 ends its analysis at step 210. The data can be retrieved from the memory slots and displayed on the oscilloscope. If there are no memory slots, then the analyzer 100 can display real-time data.

Figure 3A:
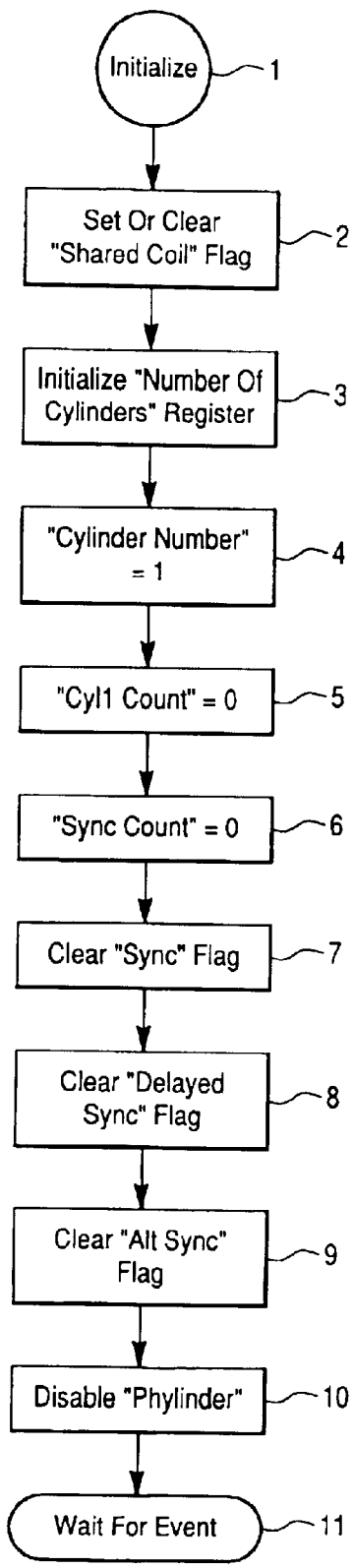
FIG. 3A is a flow chart of the initialization routine of a preferred embodiment.

FIG. 3A is a flow chart of the initialization routine of a preferred embodiment. At step 1, an initialization routine occurs when the user selects the engine parameters, such as the type of engine, number of cylinders, etc.). At step 2, a "shared coil" flag is set or cleared. The flag is set if the user selected an engine that uses a shared coil ignition system. The shared ignition system typically generates two sync pulses for every engine cycle. If the flag is set, every other sync pulse will be ignored by the analyzer. At step 3, the "number of cylinders" is set or initialized to equal the number of cylinders for the selected engine. At step 4, set "cylinder number" equal to 1. This register is the reference number of the current active cylinder. At step 5, the "cyl 1 count" registry value is set to 0. The "cyl 1 count" registry is used to determine if the pseudo cylinder signal should be disabled and is incremented or increased in the "Cylinder Event" routine (at step 38 below) when the event is associated with the first cylinder. The "cyl 1 count" registry is set to 0 in the "Sync Event" routine (at step 20 below). At step 6, the "sync count" registry is set to 0. This registry is used to determine if the pseudo cylinder signal should be enabled. The "sync count" registry is incremented and tested in the "Sync Event" routine and cleared in the "Cylinder Event" routine. At step 7, the "sync" flag is cleared. The "sync" flag is used in the "Delay Timer" event (below). At step 8, the "delayed sync" flag is cleared. The "delayed sync" flag is used in the "Delay Timer" event as a delayed indication that a sync event occurred during the current cylinder number. The flag is used because the "Sync Event" and the "Cylinder Event" are asynchronous to each other, and the order in which they occur can not be guaranteed. This delayed signal helps to ensure that the "Sync Event" will be associated with the correct cylinder. At step 9, the "alt sync" flag is cleared. The "alt sync" flag is used for shared coil ignition systems to ignore every other "sync" signal. At step 10, the pseudo cylinder signal is initially disabled from injecting the missing cylinder event. At step 11, the analyzer is in a hold state and waits for the occurrence of the next event.

Figure 3B:
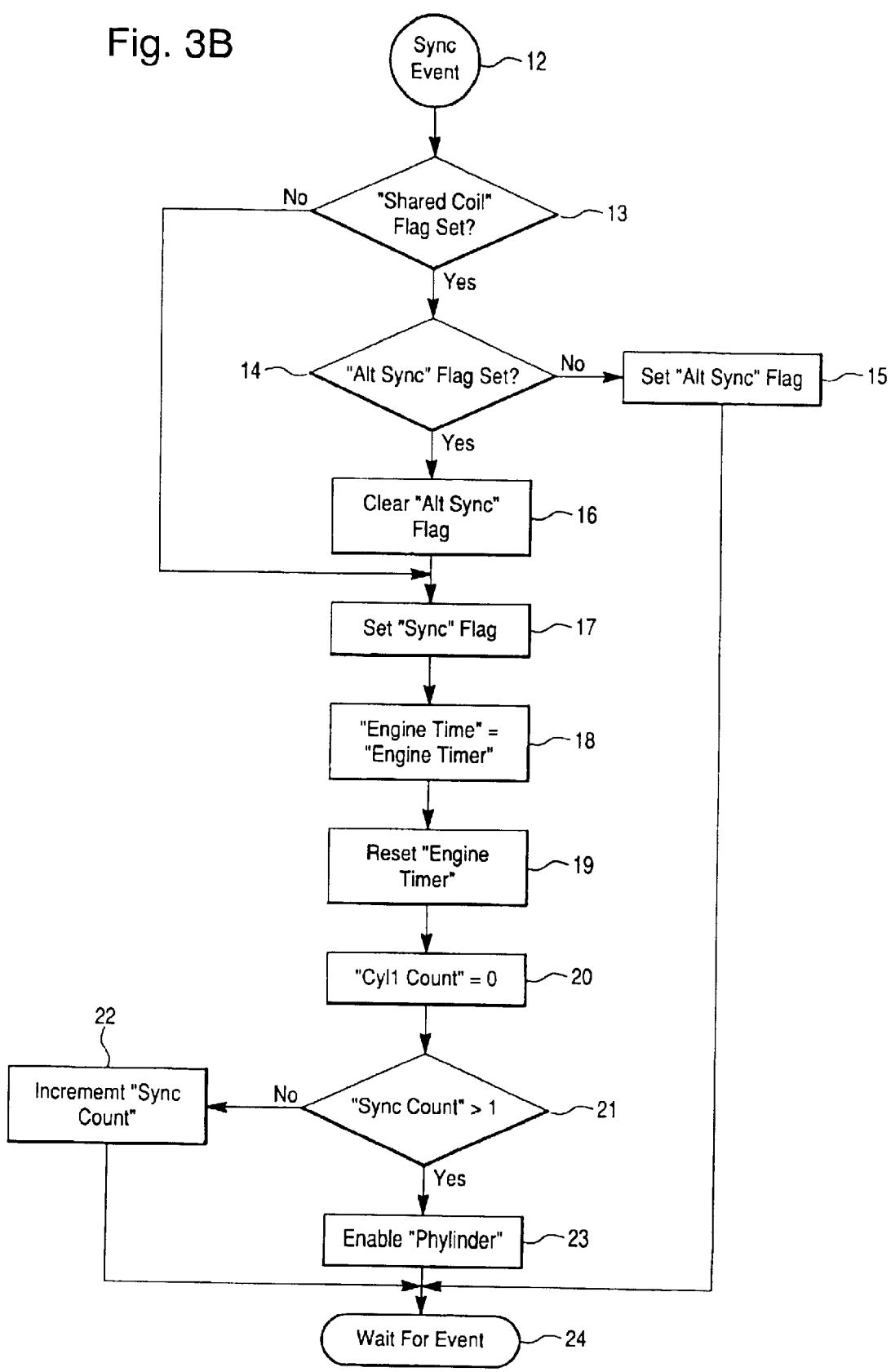
FIG. 3B is a flow chart of the "Sync Event" Routine of the preferred embodiment.

FIG. 3B is a flow chart of the "Sync Event" Routine of a preferred embodiment. At step 12, if a "Sync Event" occurs, then proceed to step 13 to determine if the "shared coil" flag was previously set (at step 2) in order to check for a valid "Sync Event". If the flag was set, then proceed to step 14, if not, then proceed to step 17 to process every "Sync Event". At step 14, a check is made to determine if an "alt sync" flag is set. If the flag is set, go to step 16, if not, go to step 15. At step 15, since the "alt sync" flag is cleared, the "alt sync" flag is set, and the program proceeds to step 24 to ignore this invalid "sync event" and wait for the next event. At step 16, because the "alt sync" flag was set, it will be cleared and thus, the ignition event is valid and data will be collected for the ignition event. At step 17, the "sync" flag is set. This will be used in the "Delay Timer Event" (at step 46 below). At step 18, the "engine time" register is set equal to the current "engine timer" value. The "engine timer" can be a free running timer that is used to continuously measure the time between consecutive first cylinder events or an engine cycle. At step 19, the "engine timer" is reset to begin timing the current engine cycle. This reset does not stop the timer, but resets the time to zero while the timer remains running. At step 20, the "cyl 1 count" register is set to 0. This register is incremented in the "Cylinder Event" routine at step 38. At step 21, the value of the "sync count" register is checked. If the value of the number stored in the "sync count" register is less than 2, then go to step 22 (where the count is incremented) or else go to step 23, and then proceed to step 24. At step 23, because the value is greater than 1, the pseudo cylinder signal is enabled. At this point, two consecutive valid "sync events" occurred without the "sync count" register being cleared. Therefore, the engine cycle time is valid. The "sync count" register can be cleared in the "Cylinder Event" routine if two cylinder events for the first cylinder occur without a "sync event" occurring within that time. This means that the sync probe is not attached or not working properly and therefore, the engine cycle times can not be validated. At step 24, the analyzer 100 is in a hold state and waits for the occurrence of the next event.

Figure 3C:
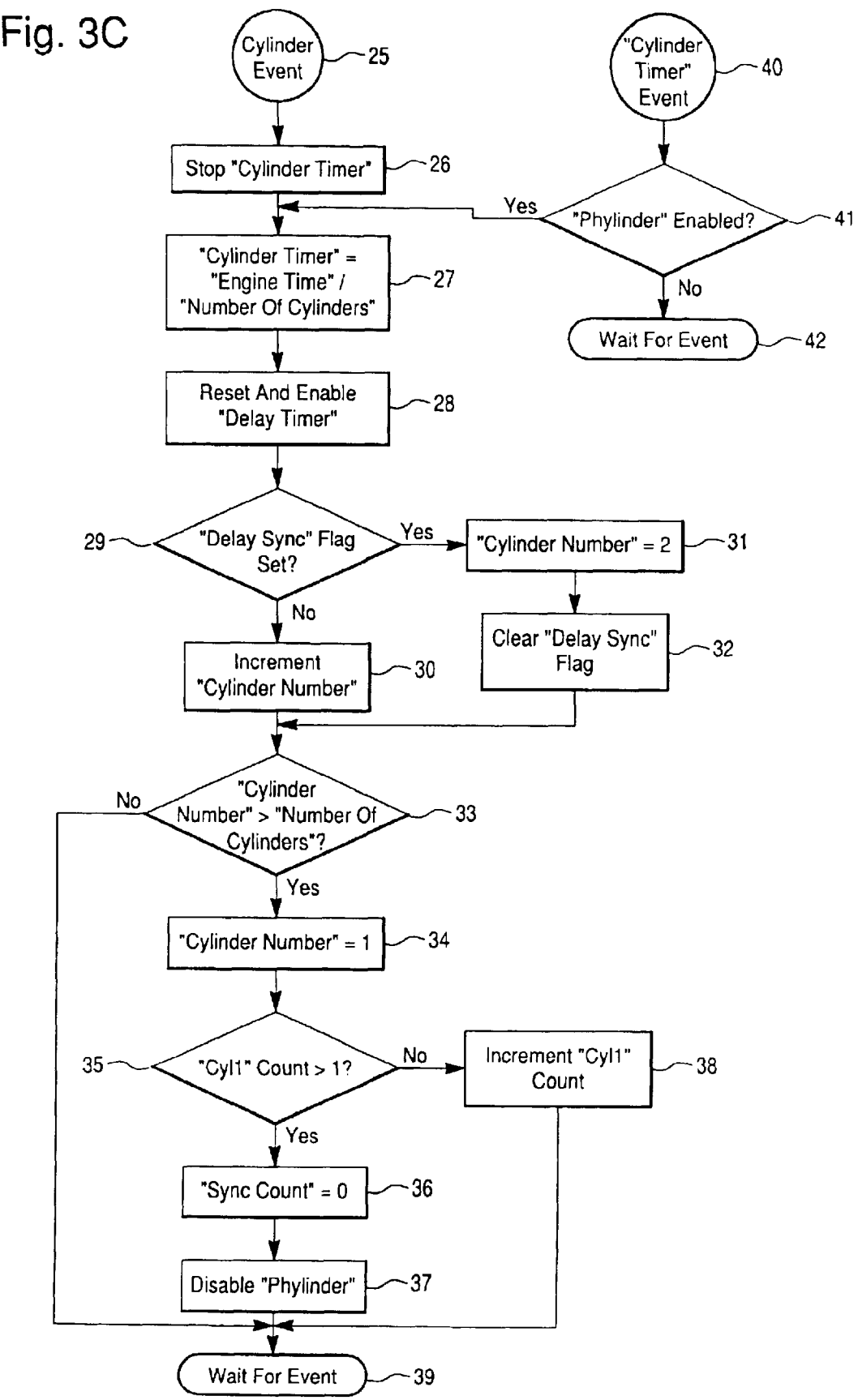
FIG. 3C is a flow chart of the "Cylinder Event" Routine of the preferred embodiment.

FIG. 3C is a flow chart of the "Cylinder Event" Routine of a preferred embodiment. At step 25, a cylinder event occurred. At step 26, the cylinder event stops the "cylinder timer". This can be started in the "Delay Timer Event" routine (step 45 below). At step 27, a "cylinder timer" timeout value is set to the "engine timer" value divided by the "number of cylinders" register value. The current value in the "engine timer" register may be the time of the previous engine cycle, which can be used to estimate the future cylinder times for the current engine cycle. At step 28, the "delay timer" or the predictive window is reset and enabled. The "delay timer" is a timer that varies with engine r.p.m. The higher the r.p.m., the shorter the delay and vice versa. The delay timer can serve two purposes, one of which is to disable the "cylinder event" during this delay period. This eliminates the false cylinder events that would have been caused by the multiple cylinder ignition sparks generated in "multi-strike" ignition systems. The second purpose is to compensate for r.p.m. variations. The delay period gives a reasonable time period or cushion for the actual cylinder event to occur before the pseudo cylinder signal is generated by the controller. At step 29, the "delay sync" flag is checked. If the flag is set, then proceed to step 31, if not, then proceed to step 30. The flag can be set in the "Delay Timer Event" routine (below). At step 30, the "cylinder number" register value is incremented. At step 31, since the "delay sync" flag is set, then set the "cylinder number" register value to 2. Because the "delay sync" flag is set in the "Delay Timer Event" routine, which occurred between the previous cylinder event and this cylinder event, the "delay sync" flag is associated with the previous cylinder's event. Therefore, this cylinder event is the cylinder event after the first cylinder's event. At step 32, the "delay sync" flag is cleared.

At step 33, the "cylinder number" register value is checked. If the value is greater than the "number of cylinders" register value, then go to step 34, if not, then go to step 39. At step 34, the "cylinder number" register value is set to 1. This indicates that the engine has completed one engine cycle and is back to the first cylinder. At step 35, the "cyl 1 count" register value is checked, if the value is greater than 1, then go to step 36, if not, then go to step 38. This register is incremented on every first cylinder's ignition event and can be cleared in the "Sync Event" at step 20. If two first cylinder events occur without a "sync event", then the pseudo cylinder signal is disabled. At step 36, because the value of the "cyl 1" register is greater than 1, then the "sync count" register is reset to 0. At step 37, the pseudo cylinder signal is disabled so that it is not injected, then proceed to step 39. At step 38, increment the value of the "cyl 1" register. This value is reset in the "Sync Event" routine. At step 39, the analyzer 100 is in a hold state and waits for the occurrence of the next event.

Still referring to FIG. 3C, at step 40, the "Cylinder Timer Event" routine has timed-out indicating that no ignition event occurred within the predictive window. Thus, the pseudo cylinder signal is injected, if it is enabled. At step 41, the status of the pseudo cylinder signal is checked to determine if it is enabled. If enabled, then go to step 27, if not, then go to step 42. By proceeding to step 27, this will initialize the "cylinder timer" without stopping it. Because this event has occurred at "delay timer" time plus "cylinder timer" from the last real ignition event, the delay time is already built-in for this pseudo cylinder signal. Therefore, no "delay timer" event will be needed. At step 42, the analyzer 100 is in a hold state and waits for the occurrence of the next event.

Figure 3D:
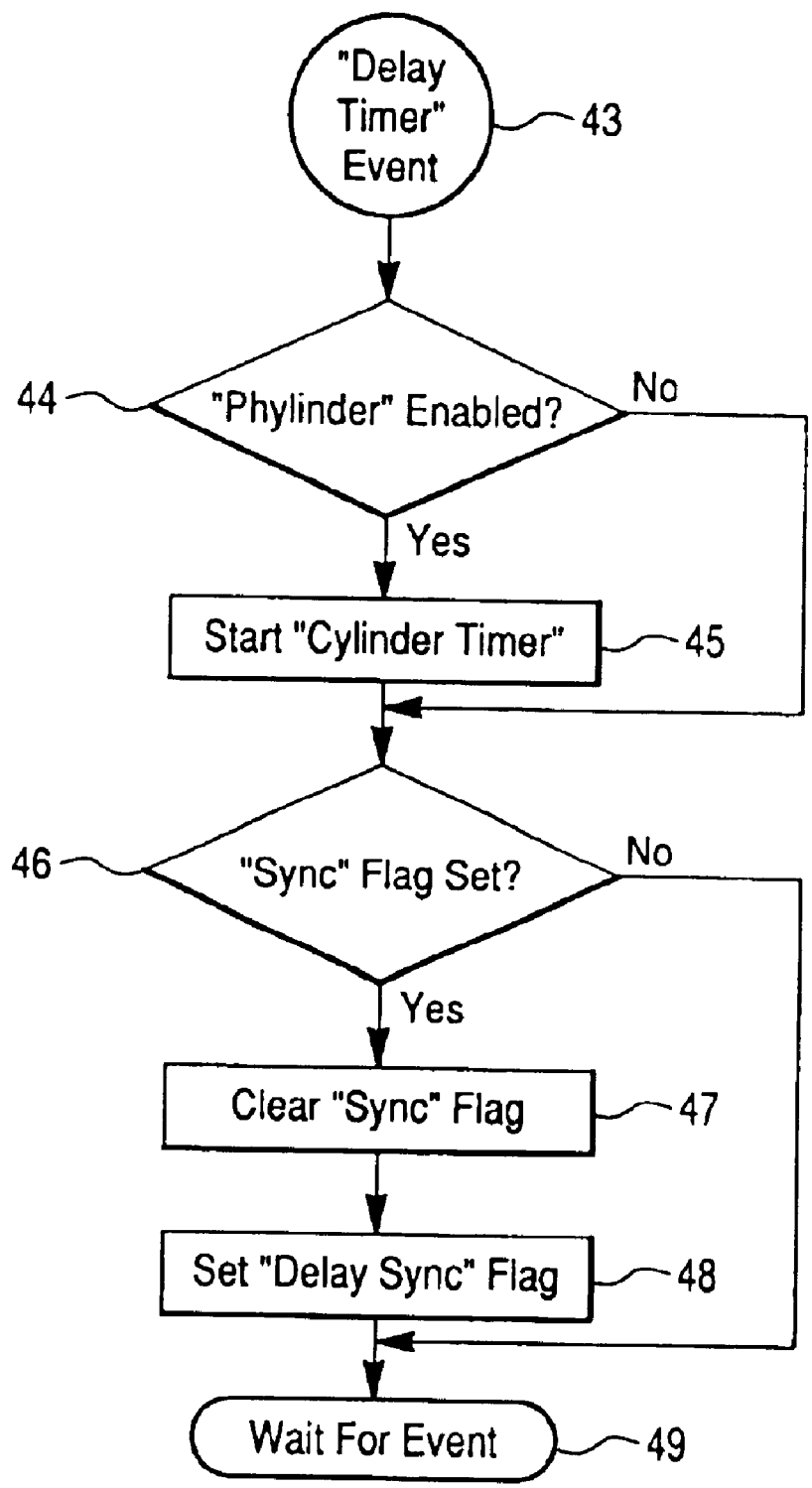
FIG. 3D is a flow chart of the "Delay Timer Event" Routine of the preferred embodiment.

FIG. 3D is a flow chart of the "Delay Timer Event" Routine of a preferred embodiment. At step 43, the "delay timer" has timed-out, triggering the "Delay Timer Event" routine. At step 44, the status of the pseudo cylinder signal is checked to determine if the pseudo cylinder signal is enabled. If enabled, then proceed to step 45, if not, proceed to step 46. At step 45, the "cylinder timer" is started, but has no effect if it is already running, and should be noted that if the timer times out before a cylinder event occurs, then the pseudo cylinder signal is triggered. At step 46, the status of the "sync" flag is checked. If the "sync" flag is set, go to step 47, if not, then go to step 49. At step 47, the "sync" flag is set indicating that the previous cylinder event has occurred at the first cylinder and will now be cleared. At step 48, the "delay sync" flag is set and is used in the "Cylinder Event" routine to indicate that the previous cylinder event was from the first cylinder. At step 49, the analyzer 100 is in a hold state and waits for the occurrence of the next event.

FIG. 4 is a graphical representation of an engine cycle. The oscilloscope can display the signals from the ignition event that are gathered from the primary and secondary leads. The signals can be displayed on the X axis, which can represent a change in time, and the Y axis which can represent a change in voltage of the ignition coil of the spark plug. The graph represents data from an engine period 450 of a four-cylinder engine. The engine period 450 may be the time from the first cylinder's ignition event 410 to the fourth cylinder's ignition event 440 and back to the first cylinder. At the first cylinder, a first ignition event 410, a first cylinder time 412, and a first data address signal 414 is illustrated. The first cylinder time 412 may be calculated by determining the engine period 450 then dividing by the number of cylinder(s). In this case, the engine period 450 is divided by four in order to determine the cylinder times 412, 422, 432, and 442. The first data address signal 414 indicates to the analyzer 100 that the first cylinder's ignition event 410 has occurred so that data from that ignition event 410 can be stored in a memory slot for later retrieval. FIG. 4 also shows the ignition events for second cylinder 420, third cylinder 430, and fourth cylinder 440. Also shown are cylinder times 422, 432, and 442 and cylinder address signals 424, 434, and 444 for cylinder numbers two, three, and four, respectively. When the cylinders of the engine are firing correctly, then the data address signals 414, 424, 434, and 444 will be sent to the analyzer 100 to initiate the collection of data for an ignition event, and store the data in the correct memory slots.

Figure 5:
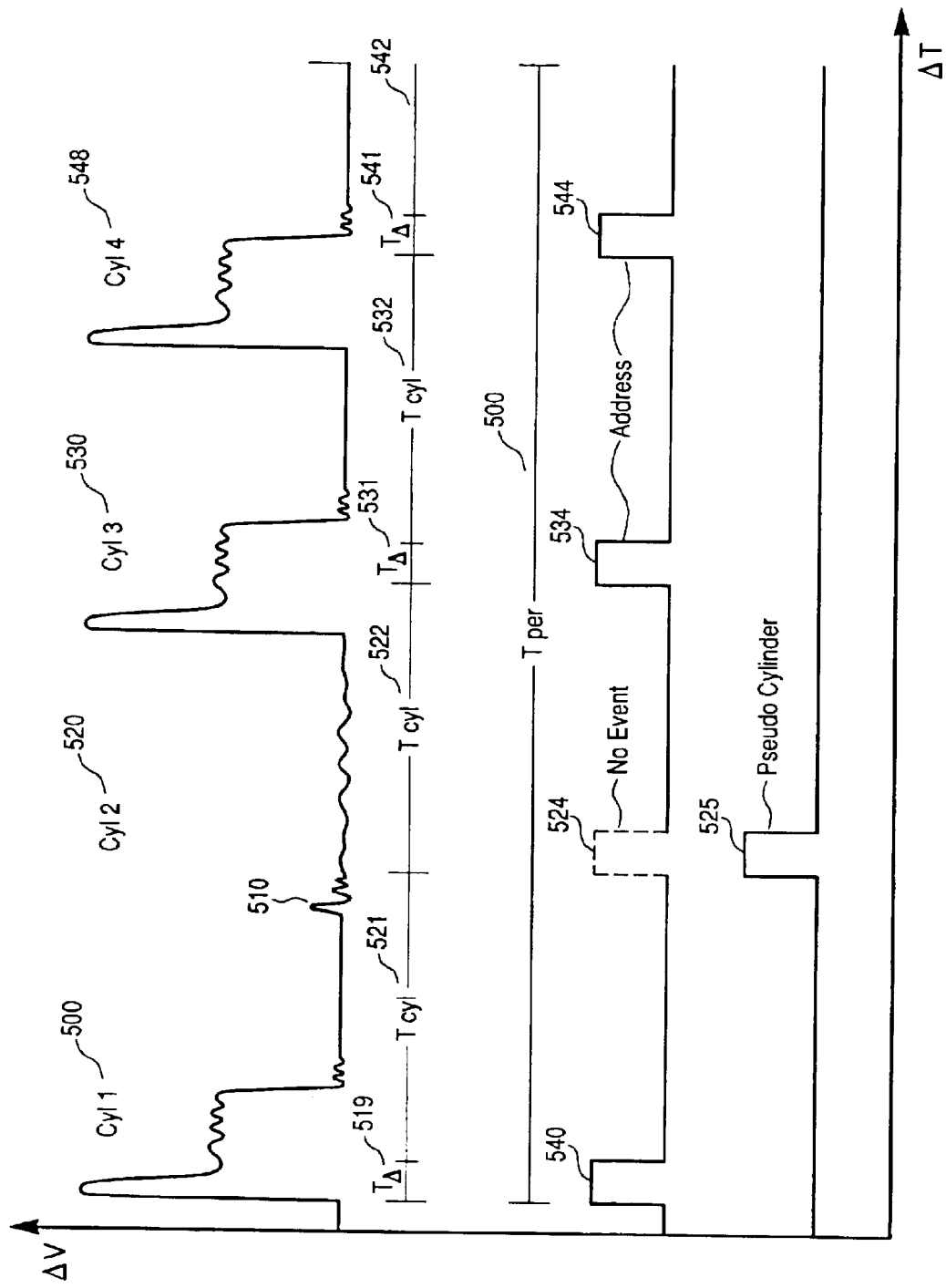
FIG. 5 is a graphical representation of an engine cycle with a misfired cylinder.

FIG. 5 is a graphical representation of an engine cycle with a misfired cylinder. The graph illustrates that the second cylinder is not working properly, and illustrates one embodiment of the present invention. The engine period 500 may be determined by having the synch probe on the first cylinder and allowing one complete engine cycle (all four cylinders) to be completed so that the second signal from the synch probe is received by the analyzer. The engine period 500 can be divided by four to determine the cylinder time for each cylinder. The cylinder time for each cylinder can be calculated by the algorithm or inputted into the controller. In FIG. 5, the first cylinder's ignition event 500 has occurred and TΔ 519 is added and shifts the cylinder time 521 slightly to the right. The shifting allows for an ignition event 520 to occur before the pseudo cylinder signal 525 is generated by analyzer 100. Because the second cylinder's ignition event 520 did not occur (only a small signal 510 was displayed because of the misfire) at the end of cylinder time 521, no data address signal 524 will be generated. Since no data address signal 524 is generated, the analyzer may not stop recording data from the first cylinder's ignition event 500 and store the data. Therefore, no new recording will be started by the analyzer. Thus, the data from the first cylinder's ignition event 500 can be skewed because data from the second cylinder's ignition event 420 can also be stored in the memory slot designated for the first cylinder's ignition event. In order to prevent the data from being skewed by the absent second cylinder's ignition event 520, the pseudo cylinder signal 525 can be generated at the end of cylinder time 521, so that the analyzer can stop recording the first cylinder's ignition event 500, store it, and start a new recording for the cylinder period 522 until the third cylinder's ignition event 530 occurs.

Because the third cylinder's ignition event 530 occurred before the end of the cylinder time 522, the pseudo cylinder signal 525 will not be generated. Additionally, because the analyzer received the third cylinder's ignition event 530, the analyzer will restart the cylinder clock and insert the TΔ 531 along with cylinder time 532 to allow a cushion of time in case the fourth cylinder's ignition event 548 is a little late. Before the cylinder time 532 is completed, the fourth cylinder's ignition event 548 occurs, and therefore, the analyzer will restart the cylinder clock and insert the TΔ 541 along with cylinder time 542 to allow a window in case the first cylinder's ignition event 500 is a little late. In other words, if an ignition event occurs, then the analyzer will insert the TΔ with the cylinder time. If an ignition event does not occur, then no TΔ is inserted and only the cylinder time for that cylinder is used.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method to fill-in an ignition event in an engine, comprising:
   determining an engine period of the engine;
   determining a cylinder time from the engine period, wherein the cylinder time is calculated by dividing the engine period by the number of cylinders;
   determining a predictive window time; and
   analyzing the cylinder ignition for a time period to determine if a fill-in signal should be injected.

2. The fill-in method of claim 1, wherein the engine period is the period of an engine cycle of the engine.

3. The fill-in method of claim 1, wherein the predictive window time is related to the r.p.m of the engine.

4. The fill-in method of claim 1, wherein analyzing the cylinder ignition event further comprises:
   starting the time period;
   determining if the ignition event occurred at the end of the time period; and
   injecting the fill-in signal if no ignition event occurs by the end of the time period.

5. The fill-in method of claim 4, wherein the time period is the predictive window time plus the cylinder time.

6. The fill-in method of claim 4, wherein the time period is the cylinder time, when the preceding event included injecting the fill-in signal.

7. A fill-in apparatus for an engine, comprising:
   an engine period determiner that calculates an engine period;
   a cylinder time determiner that calculates a cylinder time, wherein the cylinder time is calculated by dividing the engine period by the number of cylinders;
   a delayed time determiner that calculates a predictive window time; and
   a pseudo cylinder injector to inject a pseudo cylinder signal, wherein the injector and the determiners are in communication with each other.

8. The fill-in apparatus of claim 7, wherein the pseudo cylinder injector injects the pseudo cylinder signal based on a time period.

9. The fill-in apparatus of claim 8, wherein the fill-in apparatus starts the time period, and injects the pseudo cylinder signal if there is no ignition event at that cylinder by the end of the time period.

10. The fill-in apparatus of claim 7, wherein the delayed time determiner calculates the predictive window time based on the r.p.m of the engine.

11. The fill-in apparatus of claim 9, wherein the time period is the cylinder time when the previous event included injecting a pseudo cylinder signal.

12. The fill-in apparatus of claim 8, wherein the time period is the predictive window time plus the cylinder time.

13. A fill-in system for an engine, comprising:
   a means for determining an engine period of the engine;
   a means for determining a cylinder time from the engine period, wherein the determining means calculates the cylinder time by dividing the engine period by the number of cylinders;
   a means for determining a predictive window time; and
   a means for analyzing the cylinder ignition for a time period to determine if a fill-in signal should be injected.

14. The fill-in system of claim 13, wherein the means for determining the engine period calculates the engine period based on the engine cycle.

15. The fill-in system of claim 13, wherein the means for determining the predictive window time calculates the predictive window time based on the r.p.m of the engine.

16. The fill-in system of claim 13, the means for analyzing the cylinder ignition injects the fill-in signal if the ignition event does not occur by the end of the time period.

17. The fill-in system of claim 13, wherein the time period can be selected from a group consisting of a cylinder time, and a delayed time plus the cylinder time.

18. A signal generator, comprising:
   a controller that calculates an engine period, a cylinder time, a predictive window time for an engine, wherein the cylinder time is calculated by dividing the engine period by the number of cylinders; and
   a signal injector that injects a pseudo cylinder signal if an ignition event does not occur at a cylinder of the engine, wherein the controller communicates with the signal injector.

* * * * *